United States Patent
Hoerger (10) Patent No.: US 9,613,645 B2
(45) Date of Patent: Apr. 4, 2017

(54) LOCATING A HEAD ELEMENT OF A TAPE STORAGE DEVICE USING SERVO INFORMATION IN A DATA TRACK

(75) Inventor: Carl R. Hoerger, Boise, ID (US)

(73) Assignee: Hewlett Packard Enterprise Development LP, Houston, TX (US)

(*) Notice: Subject to any disclaimer, the term of this patent is extended or adjusted under 35 U.S.C. 154(b) by 1547 days.

(21) Appl. No.: 13/123,563

(22) PCT Filed: Oct. 15, 2008

(86) PCT No.: PCT/US2008/079934
§ 371 (c)(1),
(2), (4) Date: Apr. 11, 2011

(87) PCT Pub. No.: WO2010/044785
PCT Pub. Date: Apr. 22, 2010

(65) Prior Publication Data
US 2011/0199702 A1    Aug. 18, 2011

(51) Int. Cl.
*G11B 5/584* (2006.01)
(52) U.S. Cl.
CPC .................................. *G11B 5/584* (2013.01)

(58) Field of Classification Search
None
See application file for complete search history.

(56) References Cited

U.S. PATENT DOCUMENTS

| | | | |
|---|---|---|---|
| 5,523,904 A * | 6/1996 | Saliba | 360/77.12 |
| 6,021,013 A | 2/2000 | Albrecht | |
| 7,079,343 B2 | 7/2006 | Molstad | |
| 7,106,544 B2 | 9/2006 | Dugas | |
| 7,859,786 B2 * | 12/2010 | Saliba | 360/71 |
| 2006/0066976 A1 | 3/2006 | Ohtsu | |
| 2008/0024905 A1 | 1/2008 | Johnson | |
| 2011/0182157 A1 * | 7/2011 | Hoerger | 369/41.01 |

OTHER PUBLICATIONS

International Search Report, PCTUS2008079934, Feb. 4, 2009, 14 pages.

* cited by examiner

*Primary Examiner* — K. Wong
(74) *Attorney, Agent, or Firm* — Trop, Pruner & Hu, P.C.

(57) ABSTRACT

To locate an access head element of a head assembly for a tape storage device, a storage tape having a data track that contains servo information is provided. The data track further contains data. The servo information that is in the data track is used to determine a position of the access head element.

12 Claims, 4 Drawing Sheets

LOCATING A HEAD ELEMENT OF A TAPE STORAGE DEVICE USING SERVO INFORMATION IN A DATA TRACK

CROSS-REFERENCE TO RELATED APPLICATION

This application is a national stage application under 35 U.S.C. §371 of PCT/US2008/079934, filed Oct. 15, 2008.

TECHNICAL FIELD

The invention relates generally to locating a head element of a tape storage device using servo information in a data track.

BACKGROUND

Various types of storage devices are available to store data for electronic devices. Examples of storage devices include tape storage devices, disk storage devices, integrated circuit (IC) storage devices, and others.

In a linear tape storage device, data is stored on plural data tracks of a storage tape, where the data tracks extend generally longitudinally along the storage tape. The reading and recording of data in the data tracks is accomplished by using a tape head assembly, which typically includes magnetic read/write head elements for reading/recording data in the data tracks.

The storage tape is moved longitudinally with respect to the tape head assembly as the recording operation or read operation proceeds. Increasing tape storage density allows for a relatively larger amount of data to be stored on the storage tape (assuming the same storage tape size) and an increase in data access bandwidth (since a larger number of read and write head elements can concurrently access data at the same time).

However, various issues serve to limit the density of data tracks on a storage tape that can be effectively used in a tape storage device. Variations in manufacturing processes and equipment can cause variations in positions of head elements including read, write, and servo head elements during manufacture of a tape storage device. Some amount of physical tolerance has to be provided to account for such manufacturing variations, which means that off-track margins would have to be provided in data tracks to allow for variations in positions of the various head elements. Another issue that can lead to a limitation in the density of data tracks is tape tilt, which refers to the storage tape traveling across a tape head assembly at an angle (a non-zero angle from a longitudinal direction of travel). Off-track margins would also have to be provided on data tracks to account for tape tilt to ensure that head elements can accurately read or record information in the data tracks. There are also other contributors to the off-track margin that has to be provided in a data track.

The off-track margins basically specify that some amount of extra width is provided in each data track on a storage tape to allow a read or write head element to go off track by some amount and still be able to successfully perform a read or write operation. However, if the off-track margins are set too large, then the density of data tracks on a storage tape can be limited.

SUMMARY

In general, according to an embodiment, an apparatus includes a head assembly having an access head element, where the head assembly is to access content of a storage tape having a data track that contains servo information. The data track further contains data. A processing circuit is to determine a position of the access head element based on the servo information in the data track.

Other or alternative features will become apparent from the following description, from the drawings, and from the claims.

BRIEF DESCRIPTION OF THE DRAWINGS

Some embodiments of the invention are described, by way of example, with respect to the following figures.

DETAILED DESCRIPTION

In accordance with some embodiments, a technique and mechanism is provided to reduce margins (also referred to as "off-track margins" or "off-track budgets") that have to be provided between the two side edges of an access head element and the corresponding side edges of the data track on a storage tape that is being accessed by the access head element. A "storage tape" refers to a storage medium (magnetic, optical, etc.) that moves linearly to allow data to be read from or recorded to the storage tape. An "access head element" can refer to either a read head element (that reads information in the data track) or a write head element (that writes information to the data track). The access head elements can be magnetic head elements to magnetically read or write data. In alternative implementations, the access head elements can be formed using different technologies, such as optical or other technologies.

There are various contributors to the off-track margin that have to be provided in a data track for accurate reading and recording of data. Examples of such contributors include, for example, (1) physical tolerances associated with head elements formed on a tape head assembly (where physical tolerances refer to variations in positions of head elements, including read, write, and/or servo head elements, caused by variations in manufacturing processes and equipment); (2) tape tilt (caused by a storage tape traveling across a tape head assembly at an angle); (3) environmental effects (e.g., effects of temperature, humidity, etc.); and other contributors.

Techniques according to some embodiments can eliminate or reduce effects of at least some of the above contributors, such as physical tolerances and tape tilt, such that off-track margins in data tracks can be reduced. Eliminating or reducing effects of off-track margin contributors can be accomplished by calibrating locations of read and write head elements of a head assembly under test based on servo information that is written into one or more data tracks of the storage tape. Note that the servo information in the data track is separate from the servo information that typically appears in servo tracks on the storage tape. Using servo information in a data track (or multiple data tracks), positions of access head elements (read head elements and write head elements) can be determined, such that the positions of such read and write head elements can be calibrated. Calibrating positions of access head elements means that deviations of the locations of the access head elements from expected positions (whether absolute or relative to some reference point) can be ascertained so that appropriate adjustments can be made.

Calibration of positions of access head elements of head assemblies under test can be performed at various sites, such as at a factory that manufactures the head assemblies or tape storage devices including the head assemblies. Alternatively, calibration of positions of access head elements of head assemblies can be performed during actual use of head assemblies in tape storage devices.

Figure 1:
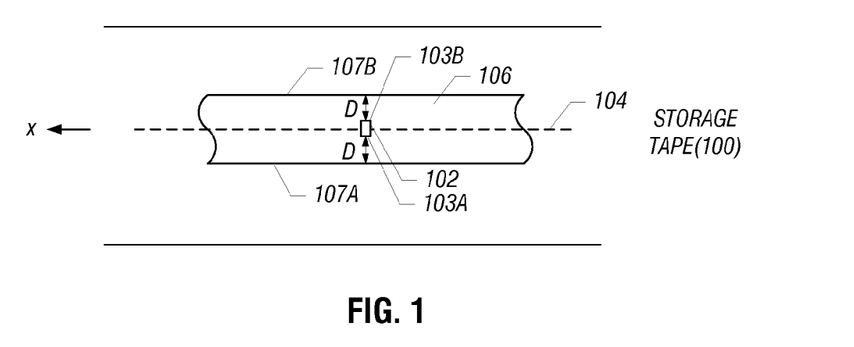
FIG. 1 illustrates an exemplary data track (including off-track margins) and a read head element for reading data on the data track, where the off-track margins of the data track can be reduced using techniques according to some embodiments.

FIG. 1 illustrates an exemplary data track 106 on a storage tape 100. A read head element 102 of a tape storage device (e.g., tape drive) is positioned over the data track 106 to read information on the data track 106. In FIG. 1, the read head element 102 is depicted as being positioned over a center longitudinal line (or track center) 104 of the data track 106. The track center 104 extends along a longitudinal direction of the storage tape (indicated by direction x in FIG. 1). The track center 104 is equidistant to the two side edges 107A and 107B of the data track 106.

During operation, it is expected that the read head element 102 may deviate from the track center 104 for various reasons. To allow for such expected deviation, off-track margins are provided between the side edges 103A, 103B of the read head element 102 and corresponding edges 107A, 107B of the data track 106. Each off-track margin depicted in FIG. 1 has a distance D, which is the distance between the side edge (103A or 103B) of the read head element 102 and the corresponding side edge (107A or (107B) of the data track 106. The amount of off-track margin that has to be provided on the two sides of the read head element 102 is based on various contributors to the off-track budget, as discussed above.

Increasing the value of D in a data track will reduce track density of a storage tape (in other words, for a storage tape of a given width, presence of relatively large off-track margins can prevent a higher density of data tracks on the storage tape). A higher density of data tracks allows for a greater density of data to be stored on the storage tape, and a greater bandwidth to be provided since a larger number of access head elements can concurrently access (read or write) data on the data tracks.

Figure 2:
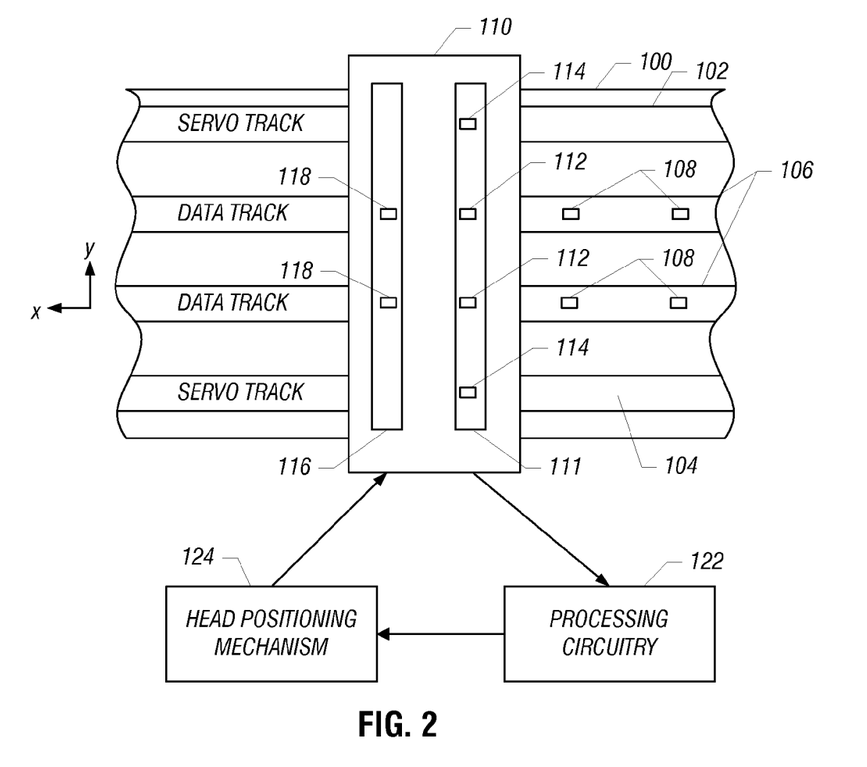
FIG. 2 illustrates a portion of a tape storage device having a head assembly and a storage tape with servo tracks and data tracks, where the data tracks include servo information according to an embodiment.

FIG. 2 shows a portion of an exemplary tape storage device that has a head assembly 110 for accessing a storage tape 100 that has servo tracks 102 and 104 and a number of data tracks 106. Although just two servo tracks 102 and 104 are depicted on the storage tape 100, it is noted that in alternative implementations, less or more servo tracks can be used. The data tracks 106 are used for storing data, where "data" refers to user data, data associated with software applications, software instructions, or any other data that is distinguished from control information associated with a tape storage device to perform control or management tasks of the tape storage device that accesses the storage tape.

In accordance with some embodiments, in addition to storing data in the data tracks 106, at least one of the data tracks 106 also further stores servo information 108 interspersed with the data and provided at various locations along the length of the data track 106. For example, the servo information 108 can be provided in short intermittent bursts along the length of the data track 106. Alternatively, servo information 108 can be initially written continuously along the data track 106, with portions of the servo information overwritten with actual data during operation of the tape storage device. The portions of the continuous servo information that remain in the data track 106 would appear as intermittent bursts of servo information 108 along the data track. As yet another implementation, the servo information can be placed at the beginning and/or end of the data track 106 and/or as a single section in the middle of the data track.

Portions of the servo information 108 that can be recorded onto the data tracks 106 can be timing-based servo information. Timing-based servo information includes servo patterns in the form of servo stripes. The servo stripes can have different angular orientations (also referred to as azimuthal orientations), with repeating patterns of servo stripes recorded as the servo information 108 in a data track 106 in FIG. 2. A read head element is able to read the servo information 108 on the data track 106 for deriving various distance information (corresponding to distances between various arrangements of servo stripes) to determine the lateral position of the read head element over the data track. An alternate embodiment is the use of amplitude-based servo marks.

It is noted that the same type of timing-based servo information can also be recorded in the servo tracks 102 and 104 of the storage tape 100 of FIG. 2.

As further depicted in FIG. 2, the head assembly 110 provided over the storage tape 100 has a number of read head elements 112 positioned over respective data tracks 106 of the storage tape 100. Generally, the head assembly 110 extends laterally across the width of the storage tape 100, with the read head elements 112 arranged as an array along the lateral direction (direction y transverse to the longitudinal direction x) for positioning over the respective data tracks 106.

According to some implementations, the head assembly 110 has a read bump 111 and a write bump 116. The read bump 111 includes the read head elements 112 as well as servo head elements 114 positioned over respective servo tracks 102 and 104 for reading the servo information on the servo tracks 102 and 104. As further depicted in FIG. 2, the write bump 116 of the head assembly 110 includes write head elements 118. The write head elements 118 are used for recording data onto corresponding data tracks 106. Note that the write bump 116 can also include read head elements.

In response to reading servo information on respective data tracks 106, the read head elements 112 on the read bump 111 communicate servo signals relating to the servo information 108 to processing circuit 122. Based on the servo signals, the processing circuit 122 is able to determine a lateral offset (offset in they direction) of each of the read head elements 112 with respect to the center track 104 (FIG. 1) of the corresponding data track 106. They direction is transverse to the direction of motion of the storage tape 100 (x direction). Based on the offset information, the relative positions of the read head elements can be accurately determined by the processing circuit 122. Note that the relative positions of the servo head elements 114 with respect to the read head elements 112 can also be ascertained.

Accurately determining the lateral offset of each read head element with respect to the track center of a data track can be performed by using a calibrated reference tape as the storage tape 100 of FIG. 2. In FIG. 2, the head assembly 110 is considered a head assembly under test. A calibrated reference tape is a storage tape having data tracks containing servo information that have been calibrated by a "gold-standard" or "calibrated" head assembly of a tape storage device. A "gold-standard" or "calibrated" head assembly is a head assembly having head elements whose positions have been accurately measured using relatively precise measurement equipment, such as optical measurement equipment or other measurement equipment.

A calibrated tape is created by first servo writing the data tracks of the reference storage tape. The calibrated head assembly can then read the servo information in the data tracks to determine whether correction factors should be applied to correct for any lateral offsets. Even with the calibrated head assembly, there may be small errors introduced when servo information is written to the data tracks of the reference tape. These errors can be reduced by averaging measurements or repeating measurements. The correction factors are stored and can be later applied when the calibrated reference tape is subsequently used to calibrate positions of head elements of a head assembly under test.

In addition, it is noted that the calibrated reference tape was created under certain environmental conditions (at a given temperature and given humidity, for example). When the calibrated reference tape is later used for calibrating a head assembly under test, different environmental conditions (e.g., different humidity and/or different temperature) may be present, which can cause the calibrated reference tape to expand or contract to a size different than the size of the calibrated reference tape at the time the calibrated reference tape was created. A scaling factor can be derived to account for the different widths of the calibrated reference tape under different environmental conditions; this scaling factor can then be applied to correct the computed positions of read head elements on a head assembly under test.

Once the relative read head element positions of the head assembly 110 are determined, the positions of the write head elements 118 can be determined relative to the positions of the read head elements 112 using one of several possible techniques. Typically, the read head elements 112 are formed on a support structure of the head assembly 110 using the same processing steps as for the servo head elements 114. Thus, offset variations between the read head elements and the servo read elements are relatively small or nonexistent. However, the write head elements 118 are formed on the support structure of the head assembly 110 in different processing steps. This can cause the offset variations between the servo head elements 114 and the write head elements 118 to be potentially large. In fact, the offset variations between the servo head elements 114 and write head elements 118 can be the largest contribution to physical tolerances.

One technique (referred to as a "bathtub curve technique") is to use the correlation between error rate and off-track measurements to create a bathtub curve from which track centers and widths can be calculated. Another possible technique ("second technique") is to write data patterns, and then using analog read head outputs to sense the edge of the write patterns as the read head element is moved away from the track center.

With the bathtub curve technique, data is written to the data tracks. Subsequently, when reading a data track, the read head element is moved away from the center longitudinal line of the data track until errors are obtained. The error rate will increase as the read head element is moved farther away from the center longitudinal line. The read head element is moved back and forth, and the error rates are monitored, which provides an indication of where the edges of the data track are relative to the center line of the data track. The bathtub curve is shaped like a bathtub, with the bottom of the bathtub corresponding to positions of the read head element where the error rates are relatively low, and the sides of the bathtub indicating increases in error rates that correspond to the edges of the data track. Based on the bathtub curve, the processing circuit 122 will be able to determine the position of the read head element relative to the write head element that performed the write of data onto the data track.

With the second technique, after a predefined data pattern has been written into the data track, the read head element is moved away from the track center, and the amplitude of the read signal from the read head element is monitored. The amplitude will start decreasing when the read head element starts to get off track. The decrease of amplitude of the signals from the read head element would provide an indication of the edges of the data track, which can then be used to determine the relative positions of the read head element and the write head element that performed the write of the data pattern onto the data track.

Figure 2A:
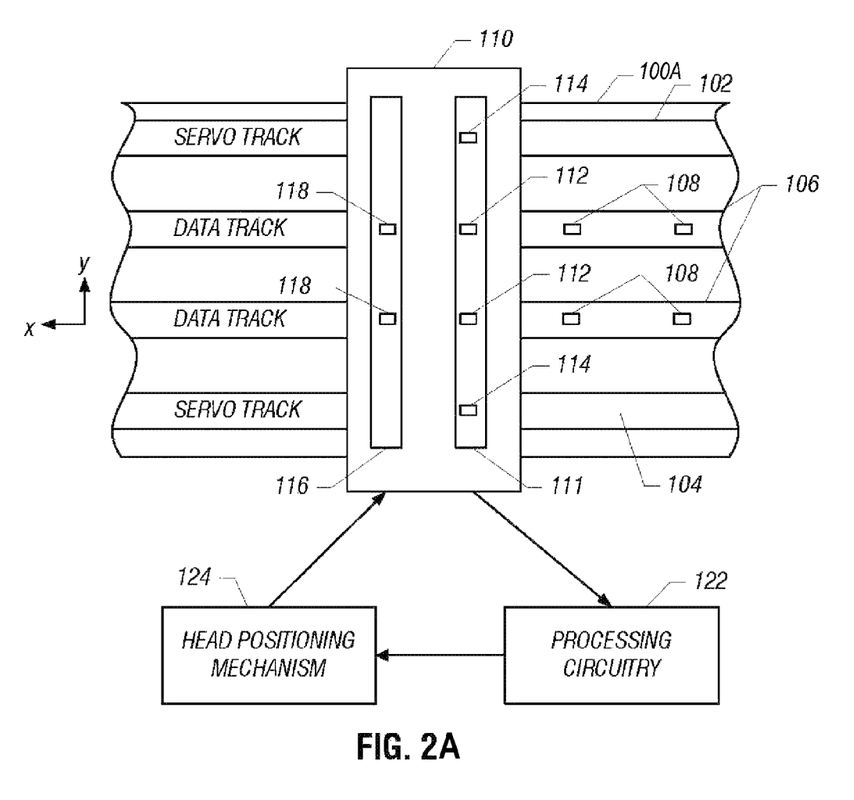
FIG. 2A illustrates a portion of a tape storage device having a head assembly and another storage tape with servo tracks and data tracks, where the data tracks include servo information according to an embodiment.

Once the relative positions of the write head elements to the read head elements are known, such relative positions of the read and write head elements can be used for adjusting the lateral position of the head assembly 110 during a read or write operation with respect to a storage tape 100A shown in FIG. 2A (which depicts an arrangement identical to FIG. 2 except that storage tape 100A is shown).

The adjustments that can be performed include moving the head assembly 110 (by a head positioning mechanism 124 as shown in FIG. 2) to different lateral positions (in the y direction) when performing read and write operations, in response to control signals provided by the processing circuit 122. For example, during a read operation, the head assembly 110 can be set at a first lateral position to center as much as possible the read head elements along track centers of corresponding data tracks 106. On the other hand, during a write operation, the head assembly 110 can be set at a second, potentially different position in an attempt to position the write head elements as close as possible to the track centers along the data tracks.

Note that the lateral position of the head assembly 110 is further adjusted based on measurements of servo patterns in the servo tracks 102 and 104, as is typically done.

By being able to independently position the read head elements and write head elements for read and write operations according to calibrated positions of the head elements as discussed above, the effect of physical tolerances due to variations in manufacturing processes and equipment to off-track margins can be eliminated or reduced. By eliminating or reducing the effect of physical tolerances associated with the read/write elements to the off-track margins, the overall off-track margin that has to be provided in each data track can be reduced.

Figure 3:
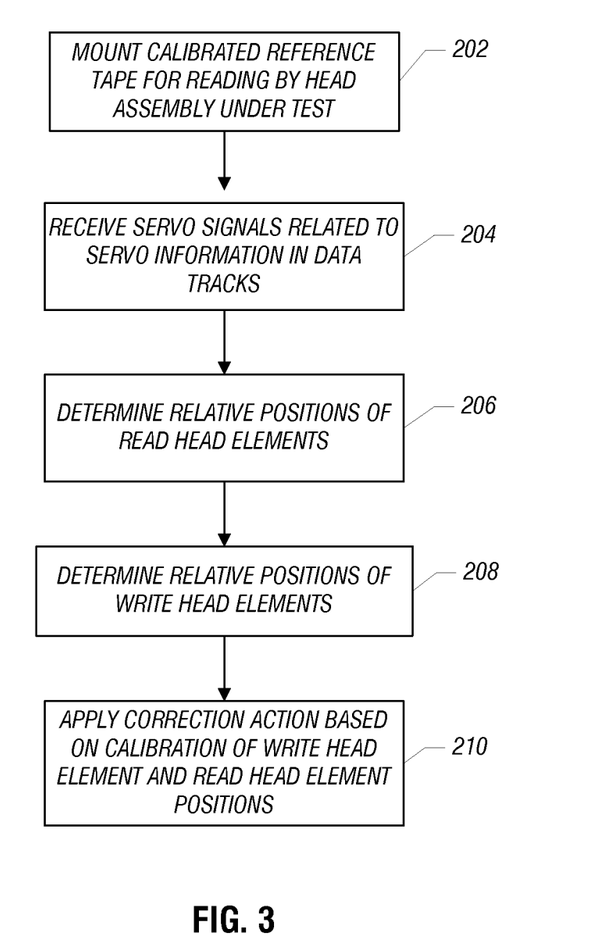
FIG. 3 is a flow diagram of a procedure to determine relative positions of access head elements, in accordance with an embodiment of the invention.

FIG. 3 illustrates a procedure for determining relative positions of read and write head elements, according to an embodiment. A calibrated reference tape (100 in FIG. 2) is mounted (at 202) into a tape storage device (that includes a head assembly under test that is to be calibrated according to techniques discussed above). The tape storage device is then activated to read servo information in the data tracks of the calibrated reference tape. The processing circuit 122

(FIG. 2) receives (at 204) servo signals related to the servo information in the data tracks. Based on the received servo signals, the processing circuit 122 is able to determine (at 206) the relative positions of the read head elements. Note that any calibration factors associated with the calibrated reference tape, as well as a scaling factor to account for environmental conditions, can be applied to adjust relative positions of the read head elements determined at 206.

Next, the processing circuit 122 determines (at 208) the positions of write head elements relative to the read head elements. Once the relative positions of the write head elements and read head elements are known, then calibration of positions of the write head elements and read head elements is provided. Based on the calibrated write head element and read head element positions, a correction action can be applied (at 210). For example, one correction action that has been described above is to set different lateral positions for the head assembly 110 during write and read operations with respect to the storage tape 100A of FIG. 2A, which allows for reduction of physical tolerances of the write and read head elements.

Other correction actions that can be performed include the following. The head assembly under test can be rejected if the lateral offsets between the write head elements, determined using the techniques discussed above, in the read head assembly are too large, such as greater than some predefined threshold. The manufacturer of a tape storage device (or of the head assembly under test) can thus determine if the physical tolerances of the read/write head elements of the head assembly under test are out of specification, prior to shipping a tape storage device containing such head assembly under test to a customer. In this way, a faulty head assembly having read/write head elements having out-of-specification lateral offsets can be discarded (or repaired) earlier in the manufacturing process, which helps to reduce manufacturing costs.

Another correction action that can be applied is that a storage tape that is dimensionally out of specification for any reason (such as due to damage, environmental effects, etc.) can be detected and flagged. Since the relative positions of the read head elements and servo head elements on a head assembly are known, the read head elements and servo head elements can be used as a ruler to measure the lateral distances between the data tracks and servo tracks on the storage tape. If it is detected that the distances between data tracks or between a data track and a servo track are too large (greater than some threshold), then an indication can be provided to a user, service personnel, or manufacturing personnel that the storage tape is dimensionally out of specification. The user, service personnel, or manufacturing personnel can then make a decision of whether or not the storage tape can continue to be used, or if the storage tape should be discarded.

Another correction action that can be applied is to control the tension that is applied to the storage tape by a tape storage device. The storage tape is mounted on reels in the tape storage device, and a user, service personnel, or manufacturing personnel can control the tension applied onto the storage tape by the reels, such as by controlling control power or current sent to the motors that rotate the reels. Thus, if it is detected that the storage tape has expanded in width by too large an amount, the tension applied onto the storage tape in the tape storage device can be increased to reduce the width of the storage tape. On the other hand, if it is detected that the storage tape has contracted in width by too large an amount, then the tension applied onto the storage tape can be relaxed to allow the width of the storage tape to increase.

Another correction action that can be performed is to correct for tape tilt. One technique of doing so is to use a first read head element on a first bump (e.g., bump 111 in FIG. 2) to read servo information in the corresponding data track. Then, a second read element on a second bump (e.g., bump 116 in FIG. 2), which is longitudinally spaced apart from the first bump in the x direction, to read servo information from the same data track. The processing circuit 122 (FIG. 2) is able to determine the lateral position of each of the first and second read head elements based on the servo information read by the read head elements. The difference between the lateral positions of the first and second read head elements indicates the amount of the tape tilt. If no tape tilt is present, then the lateral positions of the first and second read head elements should be the same since both are reading the servo information from the same data track.

Figure 4:
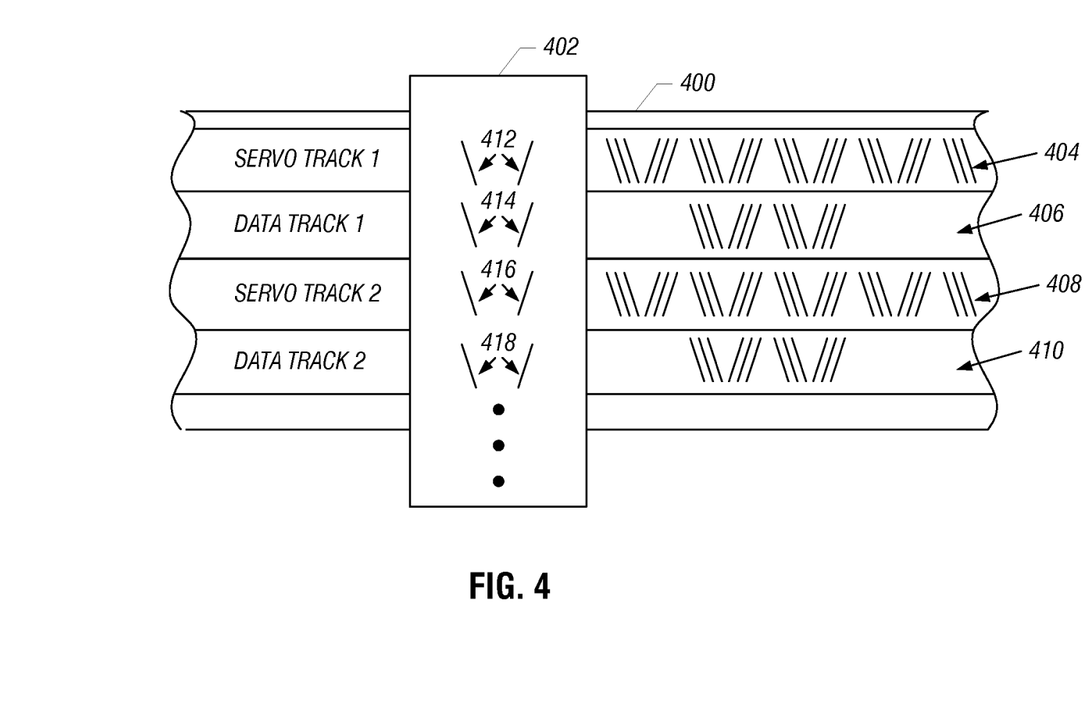
FIG. 4 illustrates a servo write head assembly for writing servo information into servo and data tracks of a storage tape, according to an embodiment.

FIG. 4 shows a servo write head assembly 402 (part of a servo write system) for writing servo information into the servo tracks (servo tracks 1 and 2 shown in a storage tape 400 of FIG. 4), and data tracks (data tracks 1 and 2 shown in FIG. 4). The servo write head assembly 402 includes servo write head elements 412 and 416 to write servo patterns 404 and 408 in servo tracks 1 and 2, respectively, and servo write head elements 414 and 418 to write servo bursts 406 and 410 in data tracks 1 and 2, respectively.

In yet another embodiment, the locations of the read head elements determined using techniques discussed above can be applied in an algorithm to recover data. Such an algorithm can be used if the spacings between the read head elements were so different from the spacings between data tracks on the tape such that some of the read head elements may be way off track, while some other read head elements are well centered. For example, assume that a storage tape has significantly expanded. Then the read head elements near the middle of the head assembly 110 may be on track, but the outer head elements may be off track. With the position information of the read head elements, after the middle read head elements that are initially on track are used to read data from the middle data tracks, the head assembly 110 can be then be moved laterally one or more times so that the outer read head elements can read the outer data tracks. The complete data would be read in at least two separate read operations associated with two different lateral head assembly positions. The data read from the separate read operations can then be reconstructed to provide the complete data set.

The processing circuit 122 depicted in FIG. 2 can be implemented as hardware to perform various tasks discussed above. Alternatively, the processing circuit 122 can be implemented as a combination of software and hardware to perform various tasks discussed above. For example, in the latter scenario, the processing circuit 122 can include a processor that is able to execute software instructions to perform the tasks. The processor can include a microprocessor, a microcontroller, a processor module or subsystem (including one or more microprocessors or microcontrollers), or other control or computing device. A "processor" can refer to a single component or to plural components.

Instructions of the software can be stored in a storage device, which is implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components. The instructions can be stored as drive firmware in flash memory within a tape storage device, for example.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations.

What is claimed is:

1. An apparatus comprising:
    a head assembly having a read head element and a write head element, the head assembly to access content of a first storage tape having a data track that contains servo information, wherein the data track further contains data; and
    a processing circuit configured to:
        determine a position of the read head element based on the servo information in the data track,
        determine a position of the write head element on the head assembly relative to the determined position of the read head element; and
        calibrate, based on the determined position of the read head element and the determined position of the write head element relative to the determined position of the read head element, the positions of the read head element and the write head element, the calibrating including adjusting, by a first amount during a read operation, a lateral position of the read head element relative to a reference path along a data track of a second storage tape, and adjusting, by a second, different amount during a write operation, a lateral position of the write head element relative to the reference path along the data track of the second storage tape.

2. The apparatus of claim 1, wherein the read head element is on a first bump of the head assembly, and the write head element is on a second bump of the head assembly.

3. The apparatus of claim 1, wherein the first storage tape has at least another data track that contains servo information, and wherein the processing circuit is to further:
    use the servo information in each of the data tracks to determine relative positions of the read and write head elements of the head assembly.

4. The apparatus of claim 3, wherein the head assembly further comprises a servo head element for reading a servo track of the first storage tape, and wherein the processing circuit is to further determine relative positions of the servo head element and the read and write head elements.

5. The apparatus of claim 3, wherein separate read operations are performed to read data from different data tracks, wherein the separate read operations are associated with different lateral positions of the head assembly, and wherein the processing circuit is to further:
    reconstruct the data from the separate read operations to form a complete data set.

6. The apparatus of claim 1, wherein the adjusting of the lateral position of the read head element and the adjusting of the lateral position of the write head element comprise moving the read head element and the write head element laterally across a width of the second storage tape.

7. The apparatus of claim 1, wherein the reference path is a track center of the data track of the second storage tape.

8. A method comprising:
    receiving servo signals based on servo information in data tracks of a first storage tape read by read head elements of a head assembly for a tape storage device;
    determining positions of the read head elements based on the servo information in the data tracks;
    determining lateral positions of the write head elements relative to the read head elements;
    independently adjusting a lateral position of the read head elements during a read operation and a lateral position of the write head elements during a write operation based on the relative positions of the read head elements and the write head elements.

9. The method of claim 8, further comprising correcting tape tilt using the servo information in the data tracks.

10. The method of claim 9, wherein correcting tape tilt comprises:
    using a first read head element to read the servo information in a first of the data tracks;
    using a second read head element longitudinally spaced apart from the first read head element to read the servo information in the first data track;
    determining lateral positions of the first and second read head elements based on reading the servo information in the first data track.

11. The method of claim 8, wherein independently adjusting the lateral position of the read head elements during the read operation and the lateral position of the write head elements during the write operation comprises:
    adjusting, by a first amount during the read operation, the lateral position of the read head elements with respect to a reference path along a data track of a second storage tape, and
    adjusting, by a second, different amount during the write operation, the lateral position of the write head elements with respect to the reference path along the data track of the second storage tape.

12. A method comprising:
    receiving servo signals based on servo information in data tracks of a storage tape read by read head elements of a head assembly for a tape storage device;
    determining positions of the read head elements based on the servo information in the data tracks; and
    performing at least one selected from the group consisting of:
        identifying another storage tape accessed by the head assembly as being dimensionally out of specification using the determined positions of read head elements; and adjusting a tension applied to another storage tape based on a detected dimension of the another storage tape and on the determined positions of the read head elements.

\* \* \* \* \*